(12) United States Patent
Weinl et al.

(10) Patent No.: US 10,252,947 B2
(45) Date of Patent: *Apr. 9, 2019

(54) METHOD OF MAKING A CBN MATERIAL (71) Applicant: SANDVIK INTELLECTUAL PROPERTY AB, Sandviken (SE)

(72) Inventors: Gerold Weinl, Alvsjo (SE); Annika Kauppi, Hasselby (SE); Malin Martensson, Nacka (SE); Torbjorn Selinder, Bandhagen (SE); Rui Shao, Dublin, OH (US)

(73) Assignee: HYPERION MATERIALS & TECHNOLOGIES (SWEDEN) AB, Stockholm (SE)

( * ) Notice: Subject to any disclaimer, the term of this patent is extended or adjusted under 35 U.S.C. 154(b) by 760 days.

This patent is subject to a terminal disclaimer.

(21) Appl. No.: 14/404,034

(22) PCT Filed: May 31, 2013

(86) PCT No.: PCT/EP2013/061309
§ 371 (c)(1),
(2) Date: Nov. 26, 2014

(87) PCT Pub. No.: WO2013/178804
PCT Pub. Date: Dec. 5, 2013

(65) Prior Publication Data
US 2015/0110663 A1    Apr. 23, 2015

Related U.S. Application Data (60) Provisional application No. 61/653,686, filed on May 31, 2012.

(51) Int. Cl.
C04B 35/645    (2006.01)
B22F 3/10    (2006.01)
(Continued)

(52) U.S. Cl.
CPC .............. *C04B 35/645* (2013.01); *B22F 3/10* (2013.01); *B22F 3/14* (2013.01); *B22F 9/04* (2013.01);
(Continued)

(58) Field of Classification Search
CPC ...... B22F 2005/001; B22F 3/10; C22C 26/00; C04B 34/645
(Continued)

(56) References Cited

U.S. PATENT DOCUMENTS 5,697,994 A * 12/1997 Packer ................... C22C 26/00
428/332
6,287,489 B1 * 9/2001 Rolander ................ C04B 35/52
264/6

(Continued)

FOREIGN PATENT DOCUMENTS

EP    1043410 A1    10/2000
JP    64011939 A    1/1989
(Continued)

OTHER PUBLICATIONS

JP04031013B2 Translation.*
(Continued)

Primary Examiner — Weiping Zhu (57) ABSTRACT

A cBN material and a method of making a cBN material, the method including the steps of providing a powder mixture comprising cBN grains, aluminum and a Ti(CxNyOz)a powder, subjecting the powder mixture to a milling to form a powder blend, subjecting the powder blend to a forming operation to form a green body, subjecting the green body to a pre-sintering step, at a temperature between 650 to 950° C., to form a pre-sintered body, and subjecting the pre-sintered body to a HPHT operation to form the cBN material. For the Ti(CxNyOz)a powder, $0.05 \leq z \leq 0.4$. In addition, (Continued)

a cBN material includes cBN grains, an Al2O3 phase, a binder phase of TiC, TiN and/or TiCN, W and Co, whereby a quotient Q is <0.25 of the cBN material.

19 Claims, 5 Drawing Sheets

(51) Int. Cl.
    *C22C 26/00*      (2006.01)
    *C04B 35/5831*      (2006.01)
    *C04B 35/626*      (2006.01)
    *C04B 35/634*      (2006.01)
    *C04B 35/638*      (2006.01)
    *B22F 3/14*      (2006.01)
    *B22F 9/04*      (2006.01)
    *C04B 35/583*      (2006.01)
    *C22C 32/00*      (2006.01)
    *B22F 9/02*      (2006.01)
    *B22F 5/00*      (2006.01)

(52) U.S. Cl.
    CPC ........ *C04B 35/583* (2013.01); *C04B 35/5831* (2013.01); *C04B 35/6261* (2013.01); *C04B 35/62655* (2013.01); *C04B 35/634* (2013.01); *C04B 35/638* (2013.01); *C22C 26/00* (2013.01); *C22C 32/0047* (2013.01); *B22F 9/026* (2013.01); *B22F 2005/001* (2013.01); *B22F 2009/041* (2013.01); *B22F 2998/10* (2013.01); *C04B 2235/386* (2013.01); *C04B 2235/3843* (2013.01); *C04B 2235/3847* (2013.01); *C04B 2235/3852* (2013.01); *C04B 2235/3856* (2013.01); *C04B 2235/3882* (2013.01); *C04B 2235/402* (2013.01); *C04B 2235/404* (2013.01); *C04B 2235/405* (2013.01); *C04B 2235/5436* (2013.01); *C04B 2235/6562* (2013.01); *C04B 2235/6582* (2013.01); *C04B 2235/661* (2013.01); *C04B 2235/80* (2013.01)

(58) Field of Classification Search
    USPC .......................................................... 419/12
    See application file for complete search history.

(56) References Cited

U.S. PATENT DOCUMENTS

| | | | |
|---|---|---|---|
| 6,676,893 B2 * | 1/2004 | Rolander | ................ C22C 1/051 419/13 |
| 2004/0002418 A1 | 1/2004 | Scurlock et al. | |
| 2005/0145067 A1 | 7/2005 | Hall et al. | |

FOREIGN PATENT DOCUMENTS

| | | | | |
|---|---|---|---|---|
| JP | 04031013 B2 | | 2/1992 | |
| JP | 04031013 B2 | * | 5/1992 | ............ C22C 29/16 |
| WO | 96/36465 A1 | | 11/1996 | |

OTHER PUBLICATIONS http://www.nzifst.org.nz/unitoperations/documents/UnitopsCh9.pdf.
Harris, Daniel. "Quantitative Chemical Analysis", pp. 17-18, 1999. by W.H. Freeman and Company, New York.

* cited by examiner

METHOD OF MAKING A CBN MATERIAL

RELATED APPLICATION DATA

This application is a § 371 National Stage Application of PCT International Application No. PCT/EP2013/061309 filed May 31, 2013 claiming priority of U.S. Provisional Application No. 61/653,686, filed May 31, 2012.

The present invention relates to a method of making a cBN material using a stoichiometric $Ti(C_xN_yO_z)_a$ binder phase raw material. The present invention also relates to a cBN material made according to the method and a cBN material.

BACKGROUND

Tools comprising cubic boron nitride (cBN) are well known in the art. Usually, cBN grains are embedded in a binder matrix which can be e.g. TiN, TiC or TiCN. Aluminum is usually also added, either in metallic form or as an Al-compound.

When making cBN tools comprising a binder matrix of TiN and/or TiCN the binder phase forming powders TiN or TiCN are substoichiometric, i.e. the ratio N/Ti or CN/Ti is substantially lower than 1. These types of powders are difficult to produce with a homogenous composition, and are therefore expensive.

Conventional cBN materials comprising substoichiometric one or more of TiN, TiC and TiCN and $Al_2O_3$ have a sintered structure comprising cBN grains, a binder phase of TiC, TiN and/or TiCN grains and $Al_2O_3$ embedded into the TiC, TiN and/or TiCN phase. The $Al_2O_3$ can be found as isolated spots in the TiC, TiN and/or TiCN phase or adjacent the cBN grains. In the structure, small WC—Co and/or W—Co islands can also usually be seen. This is debris from the milling bodies, which usually are made of cemented carbide.

JP 61-119646 discloses a cBN material having a TiCNO binder phase in the sintered structure.

WO 96/36465 discloses a PcBN or PCD material where a $Ti(CNO)_z$ raw material, where z is less than its stoichiometric value, can be used together with a metallic binder phase.

WO2009/150601 discloses a cubic boron nitride material comprising cBN, a binder matrix and a superalloy.

Pre-sintering of cBN materials are known in the art to eliminate some expensive production steps, e.g. brazing. EP1043410 A1 discloses a method for producing PcBN cutting tool inserts. The method comprises the steps of mixing PcBN powder with a liquid and a pressing agent, forming powder agglomerates, and pressing said agglomerates to form a body. The formed body is then subjected to a pre-sintering process to form a porous body which is subsequently subjected to a high pressure-high temperature (HPHT) sintering step to form a dense body.

One object of the present invention is to obtain a method of making a cBN material without using the expensive substoichiometric TiN, TiC and/or TiCN raw materials.

Another object of the present invention is to obtain a cBN material having an increased resistance against crack formation.

It is yet a further object of the present invention to provide a cBN material having an increased tool life.

DETAILED DESCRIPTION OF THE PRESENT INVENTION

The present invention relates to a method of making a cBN material comprising the following steps:
 providing a powder mixture comprising cBN grains, aluminum and a $Ti(C_xN_yO_z)_a$ powder, where $0.05 \leq z \leq 0.4$,
 subjecting the powder mixture to a milling operation to form a powder blend,
 subjecting the powder blend to a forming operation to form a green body,
 subjecting said green body to a pre-sintering step, at a temperature between 650 to 950° C., to form a pre-sintered body, and
 subjecting said pre-sintered body to a HPHT operation to form the cBN material.

The step of providing a powder mixture may comprise providing the powder mixture as a dry powder mixture or as a powder mixture comprised in a liquid, e.g. milling liquid.

The amount of cBN grains provided are in such amounts so that the cBN content in the powder mixture based on the total dry powder weight of the powder mixture suitably is between 20 to 80 wt %. The average grain size of the cBN grains, as measured by either mictrotrac (light optic scattering) or FSSS, are suitably between 0.5 to 10 μm, preferably between 0.5 to 5 μm, most preferably 0.5 to 2.5 μm.

In one embodiment of the present invention, W and Co are added. Suitably the amount of W is between 1 to 12 wt %, preferably between 2 to 6 wt %, of the sintered cBN material. The amount of Co is suitably between 0.5 to 9 wt %, preferably between 1 to 5 wt %, of the sintered cBN material. The W/Co ratio is preferably from 1.0 to 2.0.

W and Co can be e.g. added as a residue from the milling bodies, if made of WC—Co based cemented carbide or other W—Co containing material such as a cermet, or as a separate addition.

If added as a residue from the milling bodies, the composition of the milling bodies and the milling time need to be designed to give the desired amount of W and Co addition.

If the WC—Co is added as a separate addition, the WC—Co need to be "sintered", i.e. it is not possible to add separate W and Co powders. Furthermore, if added as a separate addition, it is added to the powder mixture comprising cBN grains, aluminum and $Ti(C_xN_yO_z)_a$ powder. In one embodiment, the WC—Co is added as recycled cemented carbide, sometimes called PRZ.

The amount of aluminum provided is between 1 to 10 wt %, preferably 3 to 9 wt % and most preferably 4 to 8 wt %, of the total dry powder weight of the powder mixture. The amount of aluminum is dependent of the oxygen content in the $Ti(C_xN_yO_z)_a$. Suitably, the amount of aluminum should exceed the amount that is required to react all the oxygen to form $Al_2O_3$ in the raw material, i.e. both in the $Ti(C_xN_yO_z)_a$ powder and other oxygen residuals such as surface oxygen.

The amount of $Ti(C_xN_yO_z)_a$ provided is suitably between 10 to 70 wt % of the total dry powder weight of the powder mixture. The $Ti(C_xN_yO_z)_a$ powder is stoichiometric. By stoichiometric is herein meant that the ratio between the nonmetallic and the metallic elements in the binder phase raw material is close to 1. For the $Ti(C_xN_yO_z)_a$ powder that means that $0.9 \leq a \leq 1.1$, preferably $0.95 \leq a \leq 1.05$.

Further, the composition of the $Ti(C_xN_yO_z)_a$ powder are suitably so that $0.01 \leq x \leq 0.95$, preferably $0.3 \leq x \leq 0.95$, most preferably $0.5 \leq x \leq 0.95$, suitably $0 \leq y \leq 0.95$, preferably $0 \leq y \leq 0.5$, most preferably $0 \leq y \leq 0.3$ and suitably $0.05 \leq z \leq 0.4$, preferably $0.05 \leq z \leq 0.3$, most preferably $0.1 \leq z \leq 0.3$.

It is essential that the $Ti(C_xN_yO_z)_a$ powder is an oxycarbonitride or a carboxide. Conventional substoichiometric Ti(C,N) raw material powders also contain oxygen due to the exposure during milling. This oxygen is present on the surface of the substoichiometric Ti(C,N) grains and does not constitute an oxycarbonitride or a carboxide.

It is also possible to add other stoichiometric raw materials such as TiN, TiC or TiCN to replace some of, but not all, of the $Ti(C_xN_yO_z)_a$ powder.

In one embodiment of the present invention, the $Ti(C_xN_yO_z)_a$ powder has a high carbon content, i.e. $0.7 \leq x \leq 0.95$ and stoichiometric TiN is added in an amount so that TiN is replacing the $Ti(C_xN_yO_z)_a$ powder by between 5 to 55 wt %, preferably by 25 to 55 wt %.

In one embodiment of the present invention, the $Ti(C_xN_yO_z)_a$ powder has a high nitrogen content, i.e. $0.7 \leq y \leq 0.95$ and stoichiometric TiC is added in an amount so that TiC is replacing the $Ti(C_xN_yO_z)_a$ powder by between 5 to 55 wt %, preferably by 25 to 55 wt %.

In one embodiment of the present invention, the $Ti(C_xN_yO_z)_a$ powder has a nitrogen and carbon content of $0.3 \leq x \leq 0.69$ and $0.3 \leq y \leq 0.69$ and stoichiometric TiCN is added in an amount so that TiCN is replacing the $Ti(C_xN_yO_z)_a$ powder by between 5 to 55 wt %, preferably by 25 to 55 wt %.

Also small amounts of other elements common in the art of making cBN materials can be added to the powder mixture such as elements of group IVa and/or Va, i.e., Ti, Mo, Zr, Hf, V, Nb and Ta providing that the element(s) do not cause any alteration of the structure of the cBN material as is disclosed below.

In one embodiment of the present invention, the amount of cBN provided is 20 to 40 wt % of the total dry powder weight of the powder mixture and the amount provided of $Ti(C_xN_yO_z)_a$ powder is between 50 to 79 wt % of the total dry powder weight of the powder mixture.

In one embodiment of the present invention, the amount of cBN provided is 41 to 60 wt % of the total dry powder weight of the powder mixture and the amount provided of $Ti(C_xN_yO_z)_a$ powder is between 29 to 58 wt % of the total dry powder weight of the powder mixture.

In one embodiment of the present invention, the amount of cBN provided is 61 to 80 wt % of the total dry powder weight of the powder mixture and the amount provided of $Ti(C_xN_yO_z)_a$ powder is between 10 to 38 wt % of the total dry powder weight of the powder mixture.

The raw material powders of the powder mixture are mixed by a milling operation, either in a ball mill or an attritor mill, to form a powder blend. The milling is suitably made by first adding a milling liquid to the powder mixture to form a slurry. Then the milling operation is followed by a drying operation to form the powder blend.

The milling liquid is preferably water, alcohol or an organic solvent, more preferably an alcohol mixture, most preferably ethanol. The properties of the slurry are dependent on, among other things, the amount of milling liquid added. Since the drying of the slurry requires energy, the amount of liquid should be minimized in order to keep costs down. However, enough liquid need to be added in order to achieve a pumpable slurry and avoid clogging of the system.

Also, other compounds commonly known in the art can be added to the slurry e.g. dispersion agents, pH-adjusters, etc.

An organic binder, such as e.g. polyethylene glycol (PEG) or wax is preferably added prior to the milling to facilitate the formation of agglomerates and to act as a pressing agent in the subsequent pressing step.

In one embodiment of the present invention, the composition of the milling bodies and the milling time should be designed so that the desired W and Co content as disclosed above is achieved.

The slurry is dried according to known techniques e.g. spray drying or freeze drying, in particular spray drying. In case of spray drying, the slurry containing the powdered materials mixed with the organic liquid and possibly the organic binder is atomized through an appropriate nozzle in the drying tower where the small drops are instantaneously dried by a stream of hot gas, for instance in a stream of nitrogen, to form spherical powder agglomerates with good flow properties. In an embodiment, the agglomerates range from about 20 to about 150 μm in diameter. For small scale experiments, also other drying methods can be used, e.g. pan drying. In this case the powder agglomerates form the powder blend.

A green body is formed of the powder blend using conventional techniques such as cold tool pressing technology including MAP (multi axial pressing), extruding or MIM (metal injection molding), cold isostatic pressing, tape casting and other methods known in the powder metallurgy art. Forming yields a green density and/or strength that permit easy handling and green machining.

In one embodiment of the present invention, the forming is done by a pressing operation. Preferably the pressing is done by a uniaxial pressing operation at a force suitably from 5 to 40 ton.

First, the green bodies are subjected to an elevated temperature in order to remove the organic binder. Preferably, this is done in the same apparatus as the pre-sintering. Suitable temperatures for the removal of the binder are between 100 to 450° C. in hydrogen atmosphere. The temperature is dependent on the type of binder used.

The green body is then pre-sintered at temperature T, where T is between about 650 to about 950° C., preferably between about 700° C. to about 950° C., more preferably between about 850° C. to about 930° C., depending on the composition, to form a pre-sintered body. The temperature should not be above 950° C. in order to avoid undesirable reaction of the added aluminum in the green body. It is preferred that the reaction of aluminum to $Al_2O_3$ takes place during the subsequent HPHT treatment and not during pre-sintering.

In one embodiment of the present invention, after binder agent removal, the temperature is increased at a rate of about 2 to about 10° C./min, in some embodiments about 2 to about 5° C./min, up to the desired pre-sintering temperature. The temperature is maintained for about 1 to about 90 minutes until the entire charge of bodies in the sintering furnace has reached the desired temperature and the desired phase-transformation is completed. The pre-sintering step may be conducted in vacuum, or in a reactive or non-reactive atmosphere e.g. $N_2$, Ar or a carbon containing gas.

The pre-sintered bodies are typically sintered by subjecting the pre-sintered bodies to high pressure and high temperature (HPHT) to form the cBN material. This is usually performed between 50 and 75 kbar, depending however on the composition this pressure might be lowered to 35 to 60 kbar, at temperatures between from 1300 to 1600° C. The cBN material can either be formed on a cemented carbide support, i.e. a carbide back, or formed without a cemented carbide support.

In one embodiment of the present invention, the formed cBN material is cut into a tip which is then brazed to the corners of an insert of cemented carbide.

In another embodiment of the present invention, the formed cBN material can be cut into the shape of an insert.

In one embodiment of the present invention, the cBN material is a "carbide backed" body. By that is meant that the pre-sintered bodies are pressed and sintered in the HPHT process together with a cemented carbide part. The cBN composite layer will then be attached to the cemented carbide during HPHT sintering. Elements in the cemented carbide may then diffuse into the cBN composite. Examples of such elements are Co, W, Cr and C.

In one embodiment of the present invention, the cBN material is not attached to a cemented carbide support. Then the powder raw materials are blended, wet milled, spray dried and compacted into a green body. The green body is then subjected to an elevated temperature to remove the organic binder and then pre-sintered to obtain desired strength and phase composition prior to HPHT. The HPHT is then performed without a support adjacent to the cBN material.

In one embodiment the cBN material is coated with a wear resistant coating comprising single or multiple layers of at least one carbide, nitride, carbonitride, oxide or boride of at least one element selected from Si, Al and the groups IVa, Va and VIa of the periodic table by known CVD-, PVD- or MT-CVD-techniques.

The present invention also relates to a cBN material made according to the method.

Figure 2:
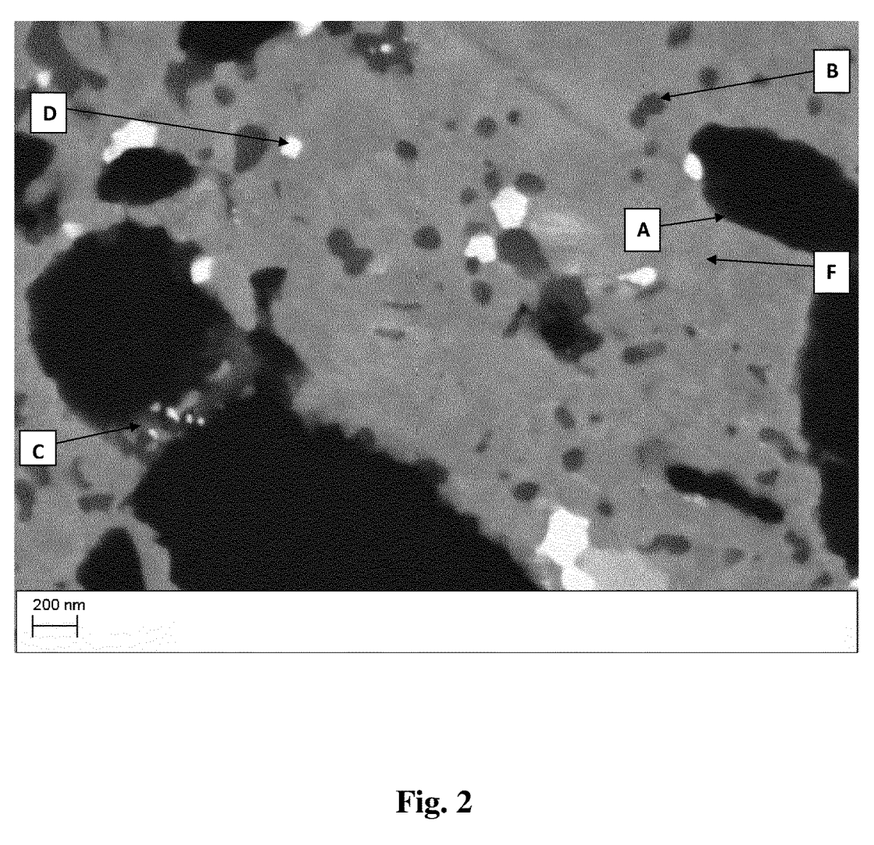
FIG. 2 shows a Scanning electron microscope (SEM) image of a cBN material according to prior art where A to C denotes the same phases as for FIG. 1. The white islands (D) are islands comprising WC—Co and/or W—Co. The binder phase (F) is TiN.

Conventional cBN materials made from substoichiometric TiC, TiN and/or TiCN and $Al_2O_3$ have a sintered structure comprising cBN grains, a binder phase of TiC, TiN and/or TiCN grains and $Al_2O_3$ embedded into the TiC, TiN and/or TiCN phase. The $Al_2O_3$ can be found as isolated islands in the TiC, TiN and/or TiCN phase. In the structure, small islands comprising W and/or Co in the form of WC—Co and/or W—Co islands can also usually be seen. This is debris from the milling bodies, which usually are made of cemented carbide. The islands comprising W and/or Co form small spots which easily can be seen in a backscattered SEM image because of their higher atom mass which makes these spots looking bright. An example of such a material is shown in FIG. 2 which corresponds to the material denoted "Comparison 1" in Example 2.

Figure 1:
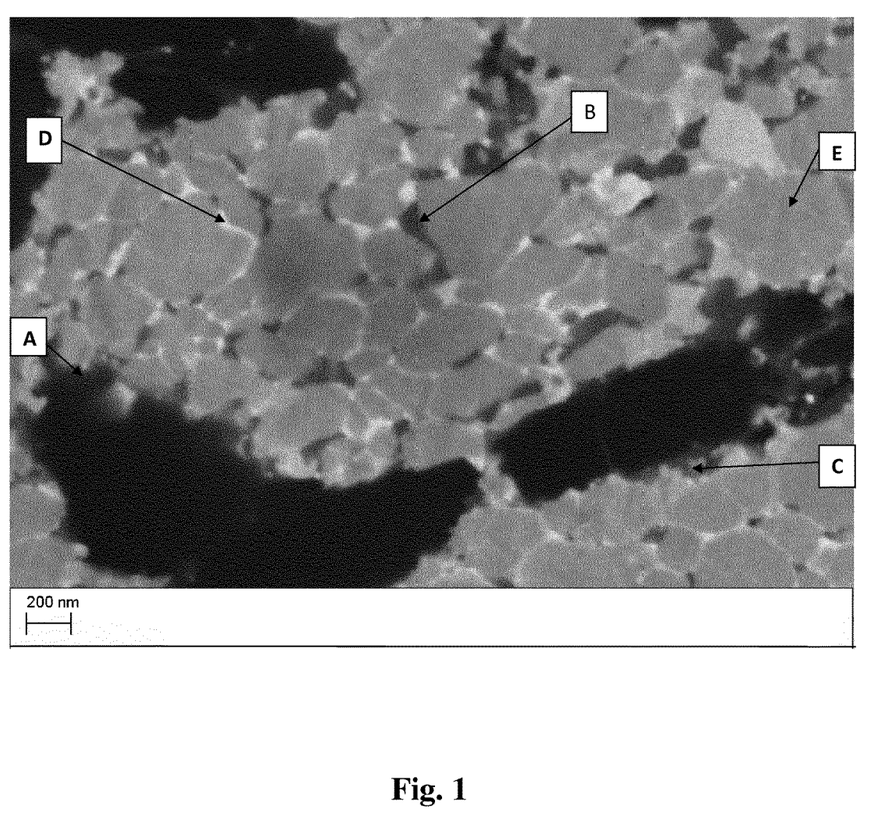
FIG. 1 shows a Scanning electron microscope (SEM) image of a cBN material made according to the present invention. The big black areas (A) are cBN grains, the light grey grains (E) are Ti(C,N) grains surrounded by a light rim (D) comprising Co and/or W. Surrounding some of the Ti(C,N) grains, also $Al_2O_3$ can be seen as grey areas (B). The grey areas (C) close to the cBN grains (A) are $TiB_2$ or AlN.

The structure of the cBN material according to the present invention is different. The cBN material comprises cBN grains, an $Al_2O_3$ phase, and a TiC, TiN and/or TiCN binder phase. The type of binder phase, i.e. if it is one or more of TiC, TiN and/or TiCN, is determined by the composition of the $Ti(C_xN_yO_z)_a$ powder used. The islands of $Al_2O_3$ are very few. Instead the $Al_2O_3$ can be found in a phase that surrounds the TiC, TiN and/or TiCN grains. In addition, in a cBN material according to the present invention comprising W and Co, the islands comprising W and/or Co are also very few. Instead W and/or Co can be found in a phase that surrounds the TiC, TiN and/or TiCN grains. Furthermore, the few islands comprising W and/or Co may consist of W, Co or W and Co. The W and/or Co islands and W and/or Co found in the phase that surrounds the TiC, TiN and/or TiCN grains may constitute a residue from milling bodies, which have been crushed/worn down during milling, if made of WC—Co based cemented carbide or other W—Co containing material such as a cermet. W and Co may also be added as a separate addition The $Al_2O_3$ phase is distributed in the grain boundaries of the TiC, TiN and/or TiCN binder phase grains. Preferably, essentially all $Al_2O_3$ and W and Co are present in the grain boundaries of the TiC, TiN and/or TiCN grains. An example of a material according to the present invention is shown in FIG. 1 which corresponds to the material denoted "Invention 2" in Example 1.

Hence, in the material according to the present invention very few islands of $Al_2O_3$ can be seen as compared to conventional cBN materials. In addition, in the cBN material comprising W and Co according to the present invention very few islands of $Al_2O_3$ and islands comprising W and/or Co can be seen as compared to conventional cBN materials comprising W and Co.

As mentioned above islands comprising W and/or Co can easily be seen in a backscattered SEM image of a cBN material because of their higher atom mass which makes these islands (spots) look bright. In fact, it can readily be seen in pictures of such SEM images by the naked eye that the cBN material comprising W and Co of the present invention comprises very few white islands comprising W and/or Co compared to a conventional cBN material comprising W and Co. This is illustrated in Example 4 below and FIGS. 4-5.

However, one way of characterizing the cBN material comprising cBN grains, an $Al_2O_3$ phase, a TiC, TiN and/or TiCN binder phase, W and Co made according to the method of the present invention is to specify that a quotient Q of the cBN material is <0.25, preferably <0.15, most preferably <0.10. The quotient Q is the quotient between an average of a fraction F and a content C. Thus, the quotient Q=(average of fraction F)/(content C).

The fraction F is the fraction in % that the total area of islands comprising W and/or Co constitutes of the total area of the cBN material in a backscattered SEM image of the cBN material at 2000-8000× enlargement. The average of the fraction F is calculated based on the fraction F of ten different backscattered SEM images of selected areas of the cBN material.

The backscattered SEM image is a SEM image in RBSE (Retro Back Scatter) mode using 10 kV acceleration voltage, 10 mm working distance and 2000-8000× enlargement giving an image covering about 80×50 μm of the cBN material. The contrast and brightness are set such that cBN grains are black, the TiC, TiN and/or TiCN grains are grey and islands comprising W and/or Co are white in the SEM image. Furthermore, the fraction F of the cBN material of the backscattered SEM image is determined by analyzing the image using a linear intercept method to determine the area of white islands comprising W and/or Co in the image. Every horizontal and vertical row of pixels are analysed and white islands comprising W and/or Co defined as having a higher brightness value than 184 on a gray scale where black is zero and pure white is 256.

The content C is the content of W in wt-% in the cBN material. The content C of W in the sintered cBN material is determined by means of XRF (X-ray fluorescence) on the pre-sintered body before HPHT. The content of W in wt % in the sintered cBN material is the same as the content of W in wt % in the pre-sintered body.

The cBN material comprising W and Co according to the present invention has a significantly lower quotient Q than conventional cBN materials comprising W and Co.

The cBN material according to the present invention is preferably used as a cutting tool. By that is herein meant that the cBN material either constitutes a whole cutting tool, e.g. an insert, or is a smaller piece, e.g. a tip, fastened to a cutting tool insert, possibly of cemented carbide.

Example 1 (Invention)

cBN materials were made from the raw materials as disclosed in Table 1. The stoichiometry of the $Ti(C_xN_yO_z)_a$ raw material was analyzed by X-ray fluorescence (XRF, Philips PW2404 instrument used in the semi-quantitative mode IQ+) and LECO (N and O were analyzed using LECO C436DR and C was analyzed using LECOCS444). The raw materials of Inventions 1-5 of Table 1 were milled. However, Invention 1-3 and 5 were milled in a ball mill, whereas Invention 4 was milled in an attritor mill. The $Ti(C_xN_yO_z)_a$ raw material was milled for 15 h in a 2.4 liters ball mill (Invention 1-3 and 5) in 99.5% ethanol with a weight ratio between milling liquid and powder of 3:4 and 8:1 between milling bodies and powders (dry weight). The milling bodies had a composition of 17.4 wt % W, 17.5 wt % Co, 50.7 wt % Ti, 9.83 wt % C and 4.84 wt % N. After the first 15 h of milling, aluminum and cBN were added in the amounts according to Table 1 and the milling continued for another 10 h. Invention 4 was milled in an attritor mill during 5 h in 99.5% ethanol with a weight ratio between milling liquid and powder of 3:4 and 8:1 between milling bodies and powders (dry weight) with all raw materials in the mill from start. For Invention 4, milling bodies with the same composition as for Invention 1-3 and 5 were utilized.

PEG was dissolved in water and this was added to the milled slurry before spray-drying, which was done using nitrogen.

The dried powder was pressed into discs of 60 mm in diameter and 2 mm in height using a 50 tons Dorst press, with a pressure in the range of 36-39 tons.

The discs were then subjected to a pre-sintering step, in a conventional vacuum sinter furnace. The pre-sintering was started with a debinder step in a $H_2$ atmosphere by increasing the temperature from 200° C. to 400° C. at a rate of 0.70 deg/min. Then the pre-sintering continued in vacuum during which the temperature was increased to 900° C. at a rate of 2 deg/min. The temperature was then held at 900° C. for 15 minutes.

The pre-sintered discs were then subjected to a HPHT step, at a temperature of about 1380° C. and a pressure of about 55 kBar.

A chemical analysis of the pre-sintered material was done, the results are shown in table 2. The elements Al, Co, Ti and W were analyzed using X-ray fluorescence (XRF). The XRF instrument was a Philips PW2404 instrument used in the semi-quantitative mode IQ+, balance boron. The non-metallic elements N and O were analyzed using LECO C436DR and C was analyzed using LECOCS444. The results in weight % can be seen in Table 2.

TABLE 2

|  | Al | Co | C | N | O | Ti | W |
|---|---|---|---|---|---|---|---|
| Invention 1 | 4 | 0.6 | 6.95 | 24.6 | 2.48 | 43.2 | 3.4 |
| Invention 2 | 4.4 | 0.8 | 7.84 | 23.1 | 3.88 | 43.1 | 3.5 |
| Invention 3 | 3.8 | 0.6 | 5.5 | 29.8 | 2.9 | 35.3 | 3.3 |
| Invention 4 | 3.70 | 2.20 | 4.36 | 25.20 | 2.76 | 43.90 | 2.90 |
| Invention 5 | 5.4 | 0.7 | 8.8 | 18.2 | 4.3 | 46.9 | 3.3 |

Example 2 (Prior Art)

Comparative materials from the raw materials as disclosed in Table 3 were made using the same process steps as in Example 1, i.e. milling, drying, pressing, pre-sintering and HPHT treatment.

TABLE 3

|  | Binder phase raw material | Amount binder phase (g) | Amount cBN (g) | cBN grain size (μm) | Amount Al (g) |
|---|---|---|---|---|---|
| Comparison 1 | $TiN_{0.72}$ | 112.5 | 77.5 | 2.3 | 10.0 |
| Comparison 2 | $Ti(C_{0.58}N_{0.42})$ | 109.1 | 80.6 | 2.3 | 10.4 |
| Comparison 3 | $TiN_{0.72}^{0.76}$ | 73.2 | 116 | 2.3 | 10.8 |

A chemical analysis of the pre-sintered material was done. The results are shown in table 4. The elements Al, Co, Ti and W were analyzed using XRF. The XRF instrument was a Philips PW2404 instrument used in the semi-quantitative mode IQ+, balance boron. The non-metallic elements N and O were analyzed using LECO C436DR and C was analyzed using LECOCS444. The results in weight % can be seen in Table 4.

TABLE 4

|  | Al | Co | C | N | O | Ti | W |
|---|---|---|---|---|---|---|---|
| Comparison 1 | 4.1 | 0.8 | 0.78 | 30.4 | 2.02 | 43.8 | 4.5 |
| Comparison 2 | 4.1 | 1.1 | 5.26 | 25.3 | 2.84 | 40.1 | 7.3 |
| Comparison 3 | 4.8 | 0.6 | 0.56 | 38.2 | 1.66 | 33.2 | 3.5 |

TABLE 1

|  | $Ti(C_xN_yO_z)_a$ | $Ti(C_xN_yO_z)_a$ (g) | TiN | cBN grain size (μm) | cBN (g) | Al (g) |
|---|---|---|---|---|---|---|
| Invention 1 | $Ti(C_{0.62}N_{0.23}O_{0.12})_{1.0}$ | 109.1 | — | 2.3 | 80.6 | 10.4 |
| Invention 2 | $Ti(C_{0.71}N_{0.06}O_{0.23})_{1.0}$ | 109.1 | — | 2.3 | 80.6 | 10.4 |
| Invention 3 | $Ti(C_{0.71}N_{0.06}O_{0.23})_{1.0}$ | 75.7 | — | 2.3 | 117.1 | 7.21 |
| Invention 4 | $Ti(C_{0.71}N_{0.06}O_{0.23})_{1.0}$ | 54.5 | 54.5 | 2.3 | 80.6 | 10.4 |
| Invention 5 | $Ti(C_{0.71}N_{0.06}O_{0.23})_{1.0}$ | 124.5 | — | 2.3 | 63.6 | 11.9 |

Example 3

The cBN materials made according to examples 1 and 2 were tested in a turning operation in the following conditions.

| | |
|---|---|
| Work piece material | 8620 Case hardened steel (hardness RC 55-63) |
| Operation | Facing |
| Cutting speed: | 200 m/min |
| Feed: | 0.2 mm/rev |
| Depth of cut: | 0.15 mm |
| Length of cut: | 113 mm |
| Cutting time per pass: | 1.2 mm |
| Cutting fluid: | None (dry) |

Figure 3:
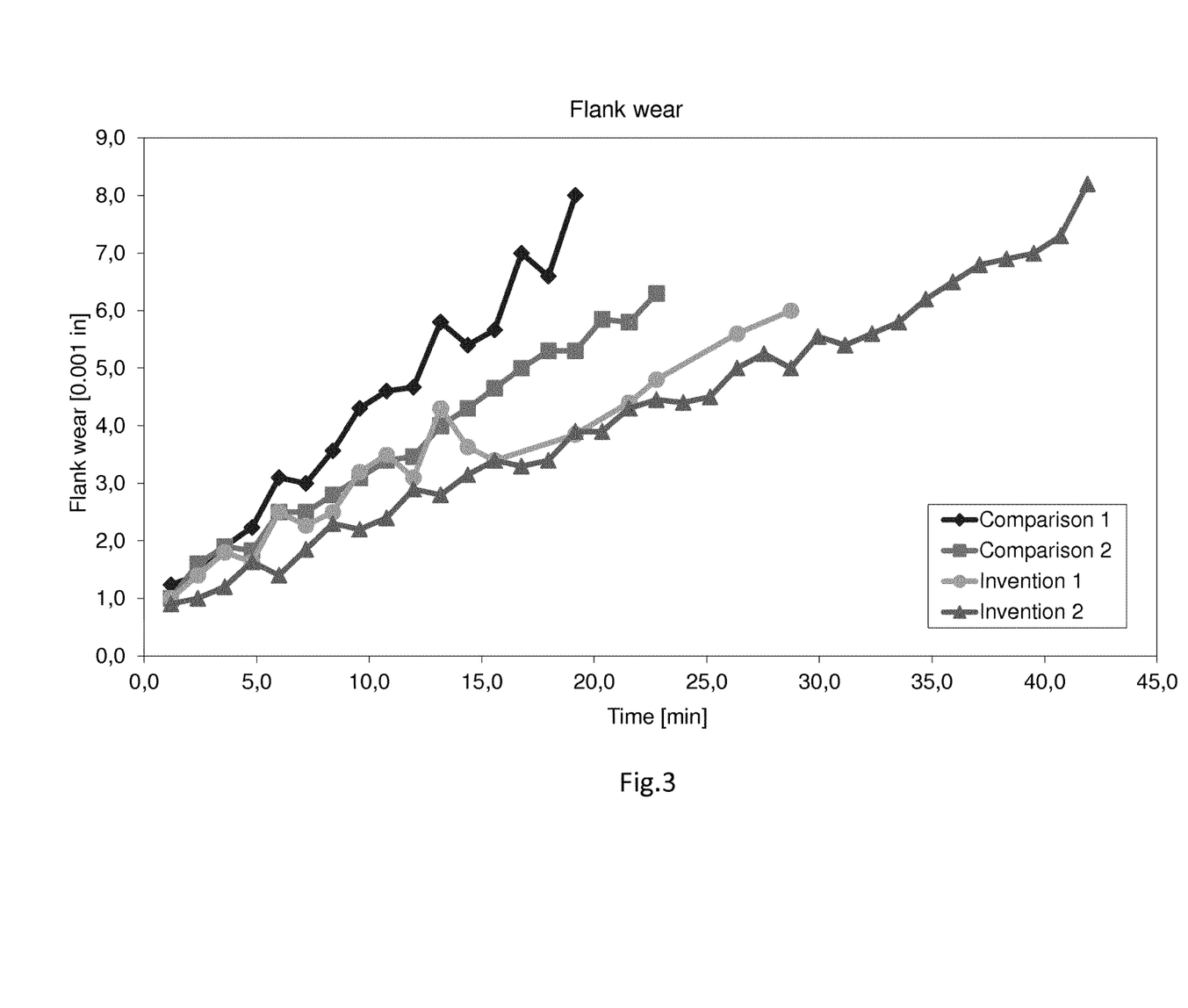
FIG. 3 shows a graph of the results of the working example 3.

Tool life criterion was 0.15 mm flank wear or chipping of cutting edge. The results of the cutting test is displayed in FIG. 3 where it clearly can be seen that the two inserts made according to the present invention, Invention 1 and Invention 2 from Example 1 have a longer tool life than the two inserts made according to prior art, Comparison 1 and Comparison 2.

Example 4

Figure 4:
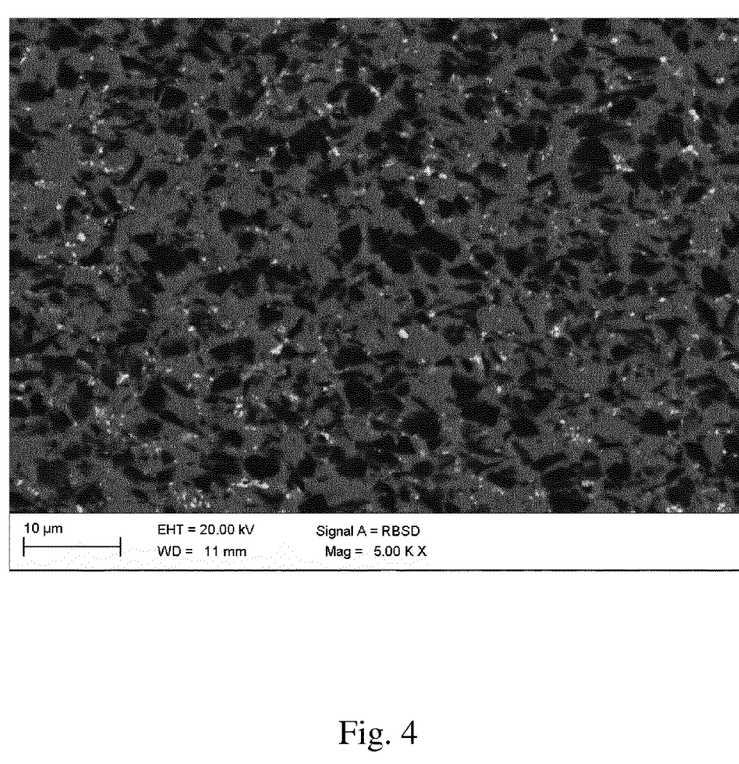
FIG. 4 shows a SEM image of a cBN material according to prior art analyzed in Example 4.

A comparative cBN material made from 300 g cBN, 154.5 g ssTiN and 13.5 g Al was made using the same process steps as in Example 1, i.e. milling, drying, pressing, pre-sintering and HPHT treatment. Investigation of the amount of visible W—Co and/or WC—Co islands (i.e. islands comprising W and/or Co) was thereafter done using image analysis of backscattered SEM images. Ten SEM images in RBSE (Retro Back Scatter) mode using 10 kV acceleration voltage, 10 mm working distance and 5000× enlargement giving images covering about 80×50 μm of selected areas of the cBN material were used. The contrast and brightness were set such that cBN grains are black, the TiC, TiN and/or TiCN grains are grey and islands comprising W and/or Co are white in the SEM images. One of these analyzed SEM images is shown in FIG. 4. The SEM images were analyzed using a linear intercept method to determine the area of white islands in the images. Every horizontal and vertical row of pixels were analysed and white islands comprising W and/or Co were defined as having a higher brightness value than 184 on a gray scale where black is zero and pure white is 256. In average of the ten SEM images, the area of the islands comprising W and/or Co (residues of milling bodies) was 1.19%, standard deviation 0.13, of the total area of the cBN material. The W content of this composite was 3.8 wt % measured by XRF on the pre-sintered body before HPHT. The XRF instrument was a Philips PW2404 instrument used in the semi-quantitative mode IQ+, balance boron. Thus, in accordance with the above definitions the average of the fraction F was 1.19 and the content C was 3.8. Thus, the quotient Q=(average of fraction F)/(content C) was 0.312.

Figure 5:
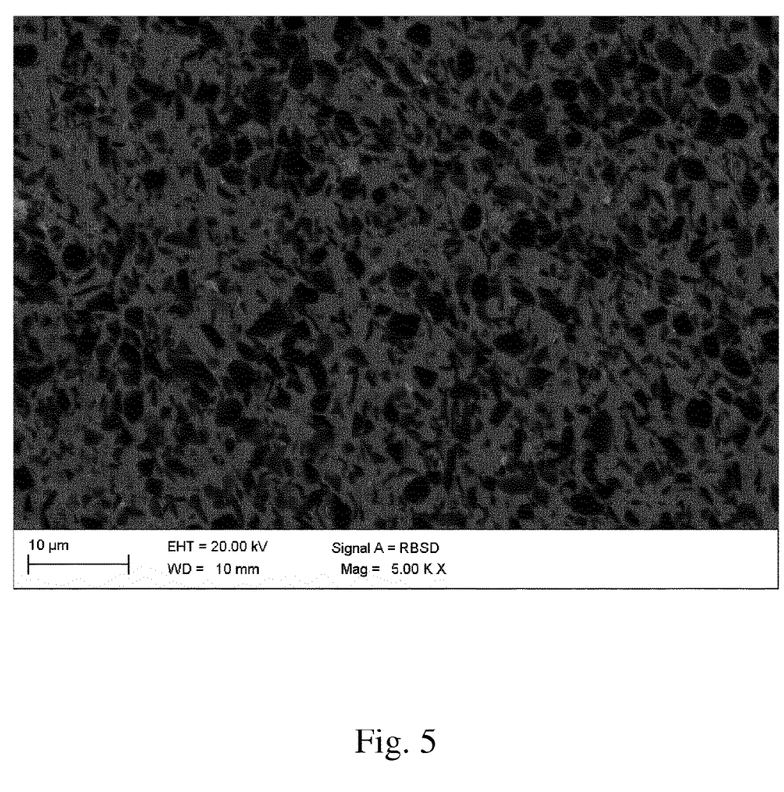
FIG. 5 shows a SEM image of a cBN material according to the invention analyzed in Example 4.

In addition, image analysis on ten backscattered SEM images of Invention 2 of Example 1 was performed using the same settings as above. One of these analyzed SEM images is shown in FIG. 5. In average of the ten SEM images, the area of the very few visible white islands comprising W and/or Co in this case was 0.18%, standard deviation 0.01, of the total area of the cBN material. The W content of this composite was 3.5 wt % measured by XRF on the pre-sintered body before HPHT. The XRF instrument was a Philips PW2404 instrument used in the semi-quantitative mode IQ+, balance boron. Thus, in accordance with the above definitions the average of the fraction F was 0.18 and the content C was 3.5. Thus, the quotient Q=(average of fraction F)/(content C) was 0.051.

The invention claimed is:

1. A method of making a cBN material comprising:
   providing a powder mixture comprising cBN grains, aluminum and a $Ti(C_xN_yO_z)_a$ powder;
   subjecting the powder mixture to a milling operation to form a powder blend;
   subjecting the powder blend to a forming operation to form a green body;
   subjecting said green body to a pre-sintering step, at a temperature between about 650 to about 950° C., to form a pre-sintered body; and
   subjecting said pre-sintered body to a HPHT operation to form the cBN material, wherein for said $Ti(C_xN_yO_z)_a$ powder, $0.9 \leq a \leq 1.1$; $0.5 \leq x \leq 0.95$; $0 \leq y \leq 0.3$; and $0.05 \leq z \leq 0.4$.

2. A method according to claim 1, wherein the $Ti(C_xN_yO_z)_a$ powder is provided in an amount of 10 to 70 wt % of the total dry powder weight of the powder mixture.

3. A method according to claim 1, wherein for the $Ti(C_xN_yO_z)_a$ powder, $0.5 \leq x \leq 0.95$, $0.0 \leq y \leq 0.3$; and $0.1 \leq z \leq 0.3$.

4. A method according to claim 1, wherein $0.7 \leq x \leq 0.95$ and stoichiometric TiN is added in an amount so that TiN replaces the $Ti(C_xN_yO_z)_a$ powder by between 5 to 55 wt %.

5. A method according to claim 4, wherein $0.7 \leq x \leq 0.95$ and stoichiometric TiN is added in an amount so that TiN replaces the $Ti(C_xN_yO_z)_a$ powder by between 25 to 55 wt %.

6. A method according to claim 1, wherein the aluminum in the powder mixture is elemental aluminum.

7. A method according to claim 1, wherein aluminum is provided in an amount of 1 to 10 wt % of the total dry powder weight of the powder mixture.

8. A method according to claim 1, wherein W is added such that the amount of W is 1 to 12 wt % of the cBN material, and Co is added such that the amount of Co is between 0.5 to 9 wt % of the cBN material, where the W/Co ratio is between 1.0 to 2.0.

9. A method according to claim 1, wherein a part of the $Ti(C_xN_yO_z)_a$ powder is replaced by stoichiometric TiN, TiC and/or TiCN.

10. A method according to claim 1, wherein a milling liquid is added to the powder mixture to form a slurry and wherein the milling operation is followed by a drying operation to form the powder blend.

11. A method according to claim 10, wherein the drying operation is done by spray drying.

12. A method according to claim 1, wherein the pre-sintering is done at a temperature of between about 850° C. to about 930° C.

13. A method according to claim 1, wherein the HPHT operation is performed at a pressure of about 55 to about 75 kbar and a temperature from about 1300 to about 1600° C.

14. A method of making a cBN material comprising:
   providing a powder mixture comprising cBN grains, elemental aluminum and a $Ti(C_xN_yO_z)_a$ powder;
   subjecting the powder mixture to a milling operation to form a powder blend;
   subjecting the powder blend to a forming operation to form a green body;
   subjecting said green body to a pre-sintering step, at a temperature between about 650 to about 950° C., to form a pre-sintered body; and
   subjecting said pre-sintered body to a HPHT operation to form the cBN material, wherein for said $Ti(C_xN_yO_z)_a$ powder, $0.9 \leq a \leq 1.1$, $0.5 \leq x \leq 0.95$; $0.00 \leq y \leq 0.3$; and $0.1 \leq z \leq 0.3$.

15. A method according to claim 14, wherein $0.7 \leq x \leq 0.95$ and stoichiometric TiN is added in an amount so that TiN replaces the $Ti(C_xN_yO_z)_a$ powder by between 5 to 55 wt %.

16. A method according to claim 15, wherein $0.7 \leq x \leq 0.95$ and stoichiometric TiN is added in an amount so that TiN replaces the $Ti(C_xN_yO_z)_a$ powder by between 25 to 55 wt %.

17. A method of making a cBN material comprising:
providing a powder mixture comprising cBN grains, elemental aluminum and a $Ti(C_xN_yO_z)_a$ powder;
subjecting the powder mixture to a milling operation to form a powder blend;
subjecting the powder blend to a forming operation to form a green body;
subjecting said green body to a pre-sintering step, at a temperature between about 650 to about 950° C., to form a pre-sintered body; and
subjecting said pre-sintered body to a HPHT operation to form the cBN material,
wherein for said $Ti(C_xN_yO_z)_a$ powder, $0.9 \leq a \leq 1.1$, $0.3 \leq x \leq 0.95$; $0.00 \leq y \leq 0.5$; and $0.05 \leq z \leq 0.3$.

18. A method according to claim 17, wherein $0.7 \leq x \leq 0.95$ and stoichiometric TiN is added in an amount so that TiN replaces the $Ti(C_xN_yO_z)_a$ powder by between 5 to 55 wt %.

19. A method according to claim 18, wherein $0.7 \leq x \leq 0.95$ and stoichiometric TiN is added in an amount so that TiN replaces the $Ti(C_xN_yO_z)_a$ powder by between 25 to 55 wt %.

* * * * *